United States Patent
Parkin

(10) Patent No.: US 10,337,616 B2
(45) Date of Patent: Jul. 2, 2019

(54) MECHANICAL SEAL ASSEMBLY

(71) Applicant: Andrew Parkin, Rotherham (GB)

(72) Inventor: Andrew Parkin, Rotherham (GB)

(73) Assignee: AES Engineering Ltd., Rotherham (GB)

( * ) Notice: Subject to any disclaimer, the term of this patent is extended or adjusted under 35 U.S.C. 154(b) by 7 days.

(21) Appl. No.: 15/638,974

(22) Filed: Jun. 30, 2017

(65) Prior Publication Data
US 2018/0003301 A1  Jan. 4, 2018

(30) Foreign Application Priority Data

Jul. 4, 2016 (GB) .................... 1611635.2

(51) Int. Cl.
*F16J 15/34* (2006.01)
*F16J 15/16* (2006.01)

(52) U.S. Cl.
CPC ......... *F16J 15/162* (2013.01); *F16J 15/3404* (2013.01); *F16J 15/3484* (2013.01)

(58) Field of Classification Search
CPC .......... F16J 15/16; F16J 15/162; F16J 15/324; F16J 15/3248; F16J 15/3268; F16J 15/34; F16J 15/3404

See application file for complete search history.

(56) References Cited

U.S. PATENT DOCUMENTS

| | | | | |
|---|---|---|---|---|
| 3,937,477 A | * | 2/1976 | Gyory | F16J 15/008 277/377 |
| 4,466,619 A | * | 8/1984 | Adams | F16J 15/162 277/367 |
| 5,217,234 A | * | 6/1993 | Hornsby | F16J 15/3404 277/366 |
| 5,553,867 A | * | 9/1996 | Rockwood | F04D 29/128 277/348 |
| 5,909,878 A | * | 6/1999 | Schrufer | F16J 15/3404 277/361 |
| 8,177,236 B2 | * | 5/2012 | Anderberg | F16J 15/3484 277/408 |

* cited by examiner

*Primary Examiner* — Gilbert Y Lee
(74) *Attorney, Agent, or Firm* — Edwin D. Schindler

(57) ABSTRACT

A mechanical seal assembly has two axially-spaced apart seals and including a rotary component that includes rotational members of each axially-spaced apart seal and a stationary component that includes stationary sealing members of each seal. A sleeve is located radially inwards of the rotational sealing members. An element, such as fluid ports, directs barrier or buffer fluid towards the sleeve and between the two axially-spaced apart seals. The sleeve is provided on its outer surface with means, such as recesses or protuberances, which displace barrier/buffer fluid axially towards both axially-spaced apart seals.

5 Claims, 6 Drawing Sheets

MECHANICAL SEAL ASSEMBLY

BACKGROUND OF THE INVENTION

Technical Field of the Invention

The present invention relates to a dual mechanical seal which acts to axially displace the barrier/buffer fluid towards each set of seal faces to promote cooling of the seal faces. The use of a circulated barrier or buffer fluid can reduce the heat generation at the seal faces by taking heat away via fluid circulation.

Description of the Prior Art

Mechanical seals are of use in many industries for providing a seal between rotating and stationary components. The seal is created by one sealing face rotating against a stationary sealing face. In order to prolong the service life of any seal it is important that heat generation is kept to a minimum.

SUMMARY OF THE INVENTION

According to the present invention, there is provided a mechanical seal assembly having two axially-spaced apart seals and comprising:

a rotary component comprising the rotary members of each seal;

a stationary component comprising the stationary sealing members of each seal;

a sleeve located radially inwards of the rotational sealing members; and, means for directing barrier or buffer fluid towards the sleeve and between the seals, wherein the sleeve is provided on its outer surface with means for displacing barrier/buffer fluid axially towards both said seals.

Thus, heat generation is made more effective by moving the barrier/buffer fluid axially towards the seal faces.

Preferably, the barrier/buffer fluid displacing means comprises a plurality of circumferentially-spaced apart recesses and/or protuberances. More preferably, the recesses and/or protuberances are elongate, extending axially along the sleeve.

Preferably, the recesses and/or protuberances extend radially by an amount which increases circumferentially from one edge to the opposite edge of each recess and/or protuberance.

Preferably, the circumferential extent of the recesses and/or protuberances is reduced at a mid-portion thereof providing a fluid cutting effect in which radial movement of the barrier/fluid is converted into axial movement in both directions towards the sealing members. More preferably, the reduction is provided by a substantially triangular shaped element extending into the recess and/or protuberance from that edge having the greater depth.

Preferably, the recesses and/or protuberances are arranged in circumferentially-spaced apart pairs, the edges of greater depth being adjacent each other.

Preferably, the stationary component surrounds at least a portion of the sleeve with a radial gap therebetween, the radial gap varying circumferentially, providing enhanced axial and radial movement of the barrier/buffer fluid.

Preferably, the assembly is provided with angled barrier/buffer fluid ports, whereby barrier/buffer fluid is fed to the rear of the stationary sealing members, thus more efficiently cooling said stationary sealing members.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1:
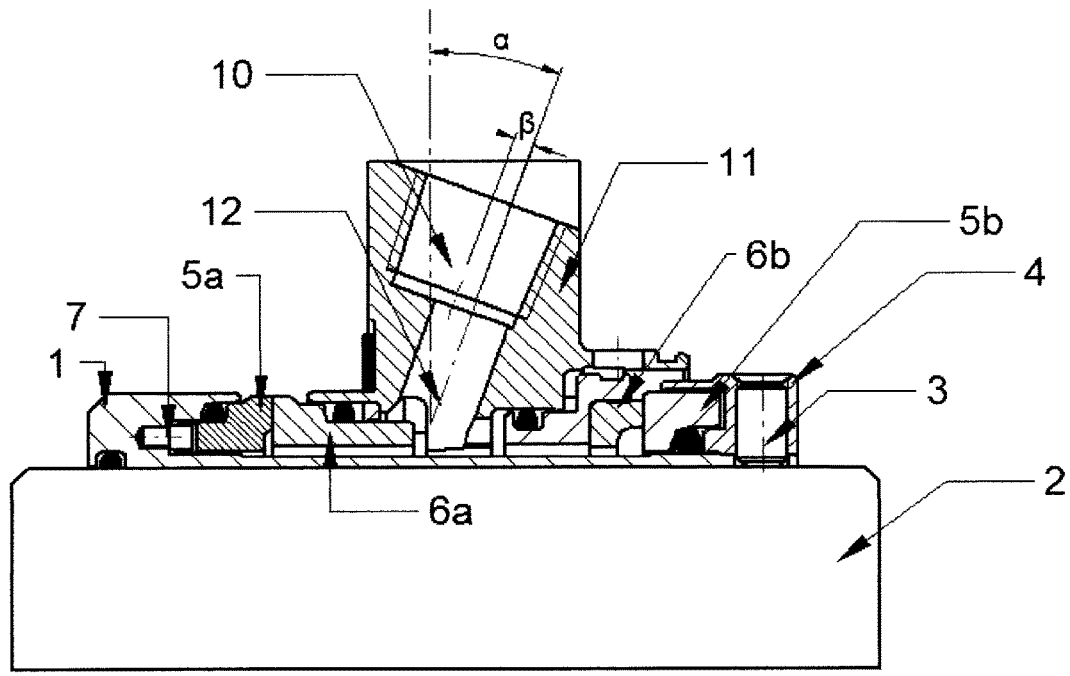
FIG. 1 is a cross-sectional view of a mechanical seal assembly in accordance with the present invention.

The invention will now be described, by way of example only, with reference to the accompanying drawings:

Referring to FIG. 1 of the accompanying drawings, there is shown a mechanical seal assembly having a sleeve 1, which is detachably attached to a shaft 2 by means of a plurality of grub screws 3. The grub screws are housed within a clamp ring 4 and provide rotational drive to the sleeve 1 and rotational sealing members 5a, 5b.

A seal is created via the stationary sealing members 6a, 6b being in contact with the rotational sealing members 5a, 5b. The inboard rotational sealing member 5a is provided with a driving force by a drive pin 7. All the aforementioned parts are housed within a gland 11. Within the gland 11 there are housed inlet and outlet ports 10 angled towards the stationary sealing members 6a, 6b and rotary sealing faces 5a, 5b. The port 10 is positioned at angle $\alpha$ to provide both optimum flow and cooling. Generally, angle $\alpha$ is 20°. The port 10 is offset by distance $\beta$ to produce an offset port 12 which is positioned directly at the inboard stationary face 6a. Generally offset $\beta$ is 0.095 inches (2.413 mm.)

Figure 2:
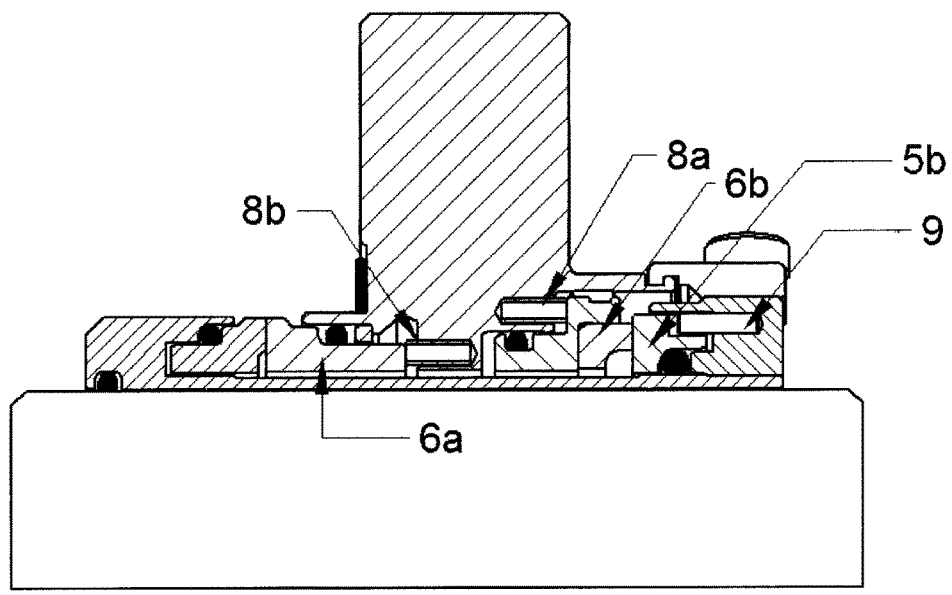
FIG. 2 is an alternative cross-sectional view of FIG. 1, which shows the plurality of springs which provide the spring force to the sealing faces.

Referring to FIG. 2 of the accompanying drawings, there is shown an alternative cross-sectional view. The stationary sealing members 6a, 6b are provided with a spring force via a plurality of springs 8a, 8b. The outboard rotary sealing face 5b is provided with a driving force by a drive pin 9.

Figure 3:
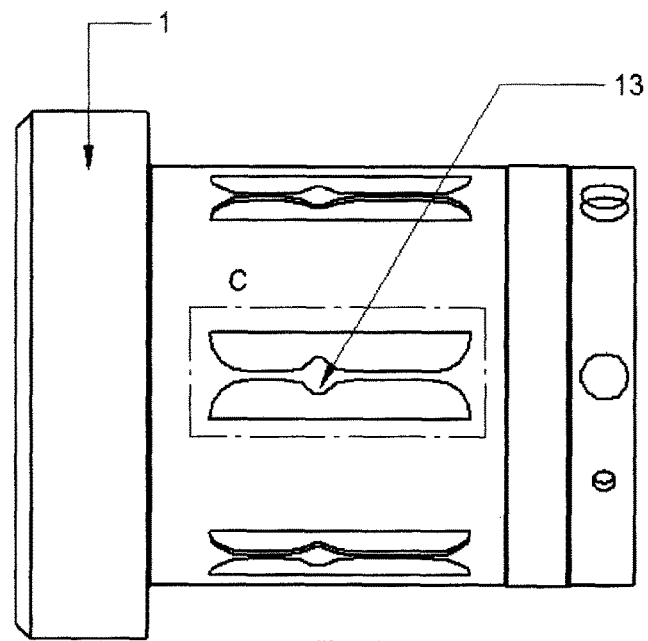
FIG. 3 is a top view of the sleeve of the assembly of FIG. 1 showing the detailed recessed sections which promote axial movement of the barrier/buffer fluid.

Referring to FIG. 3 of the accompanying drawings, there is shown a detailed view of said sleeve 1, where the axial flow inducing radially recessed sections 13 are located.

Figure 4:
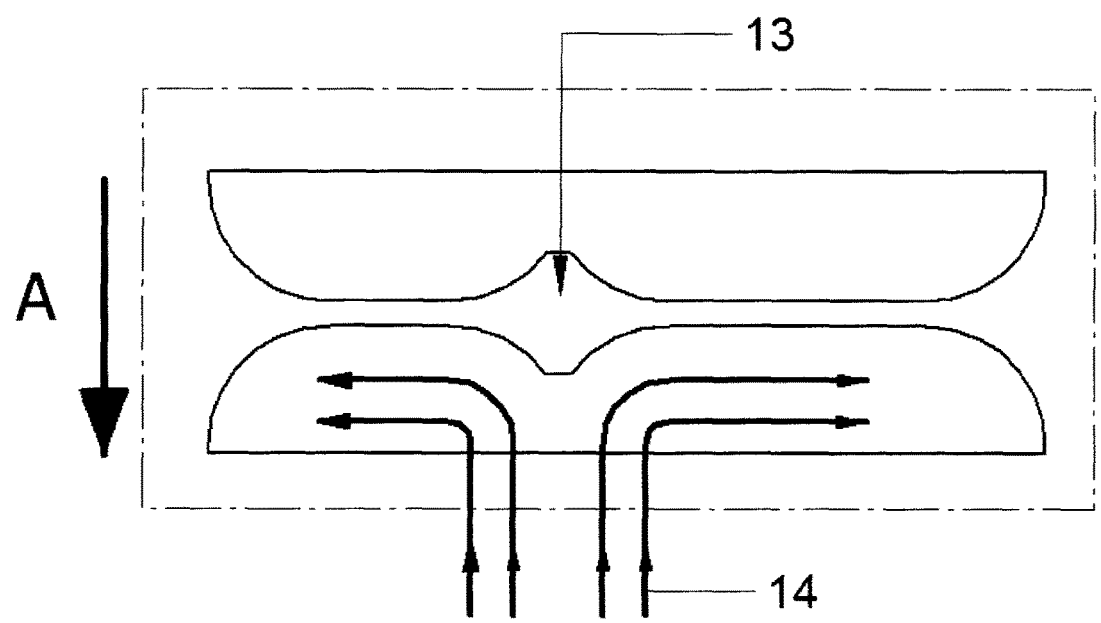
FIG. 4 is a detailed view from FIG. 3 showing the flow paths of the barrier/buffer fluid in a counter-clockwise rotation of the shaft.

Referring to FIG. 4 of the accompanying drawings, there is shown the barrier/buffer fluid flow paths 14 which occur when rotational movement of the shaft is in a counter-clockwise direction A. As shown in FIG. 4, the flow paths 14 extend in both axial directions down the length of the shaft per the clockwise rotation A.

Figure 5:
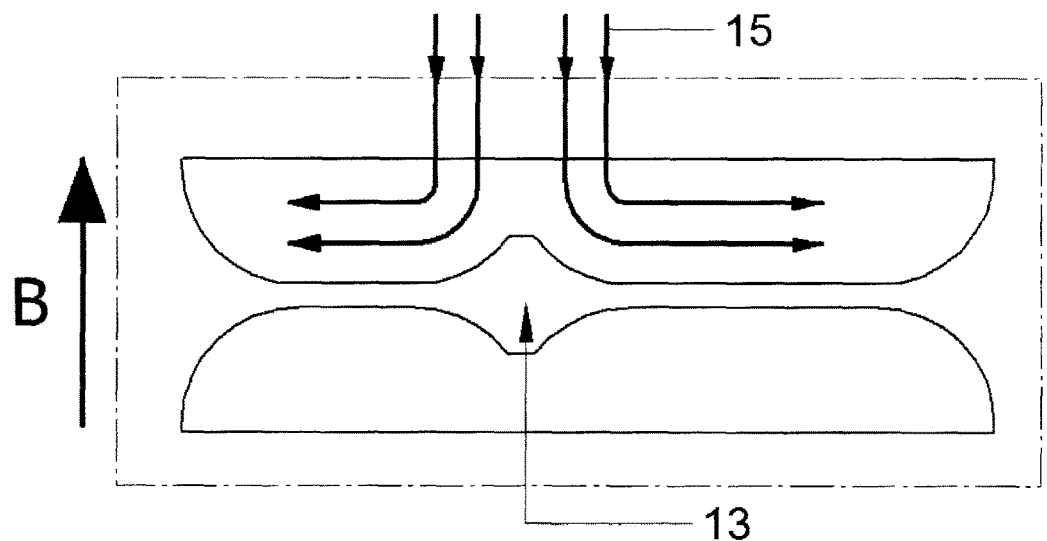
FIG. 5 is an alternative detailed view of FIG. 3 showing the flow paths of the barrier/buffer fluid in a clockwise rotation of the shaft.

Referring to FIG. 5 of the accompanying drawings, there is shown the barrier/buffer fluid flow paths 15, which occur when rotational movement of the shaft is in a clockwise direction B. As shown in FIG. 5, the flow paths 15 extend in both axial directions down the length of the shaft per the clockwise rotation B.

Figure 6:
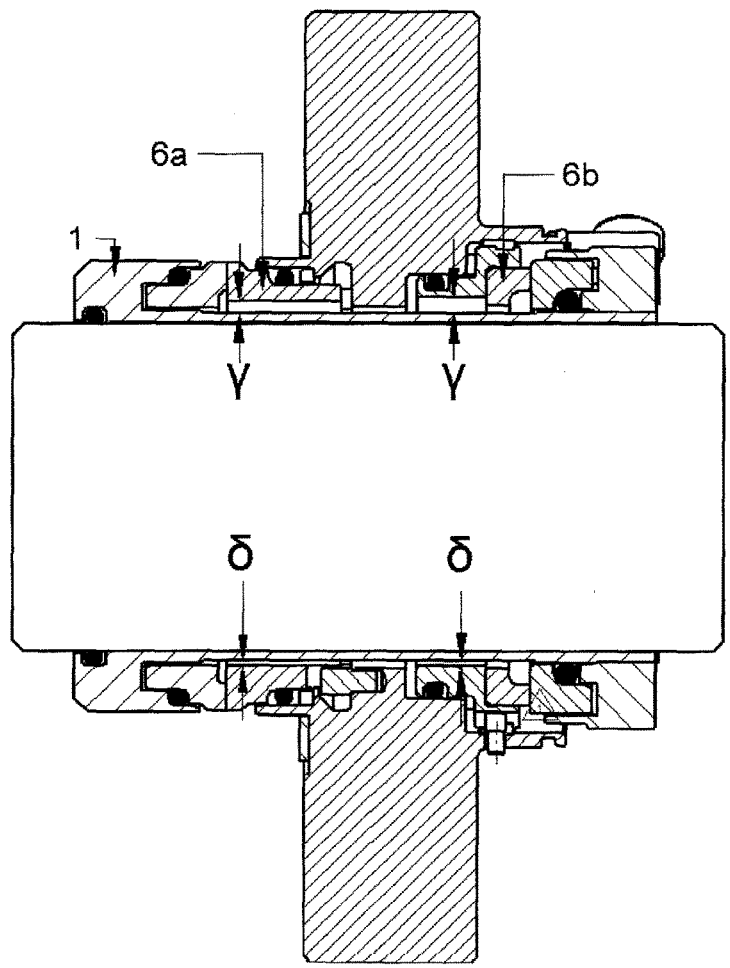
FIG. 6 is an alternative cross-sectional view showing the radial offset which is present in the apparatus between both stationary faces and the sleeve.

Referring to FIG. 6 of the accompanying drawings, there is shown an alternative cross-sectional view. Shown is the radial offset between said stationary sealing faces 6a, 6b and the sleeve 1. This offset has a larger distance γ and a smaller distance δ which allows all rotational and stationary components to be located at a safe distance with respect to one another. The offset γ, δ in addition creates a pressure differential to induce optimal flow rate around the system. Generally, the optimal offset δ is 0.030 inches (0.762 mm) and offset γ is greater than 0.070 inches (1.778 mm.)

Figure 7:
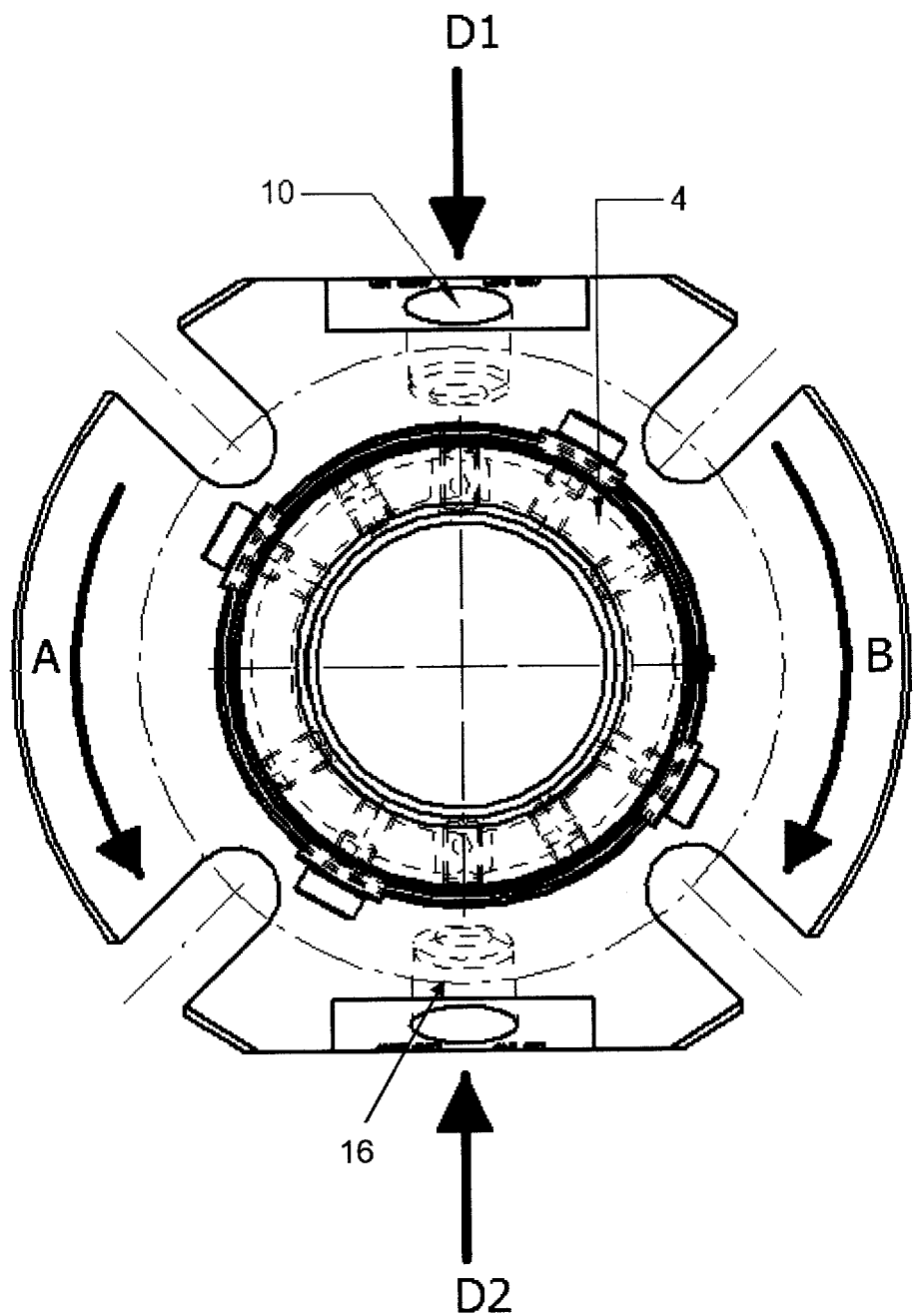
FIG. 7 is an auxiliary view of the mechanical seal showing the direction of the barrier/buffer fluid with respect to rotation of the shaft.

Referring to FIG. 7 of the accompanying drawings, there is shown the directions of the barrier/buffer fluid flow D1, D2 with respect to the alternative shaft rotations A, B. Barrier/buffer fluid flows in direction D1 when the shaft is spinning in a counter-clockwise direction A. In this instance port 10 is the inlet port and port 16 is the outlet port for the barrier/buffer fluid. Barrier/buffer fluid flows in direction D2 when the shaft is spinning in a clockwise direction B. In this instance port 16 is the inlet port and port 10 is the outlet port.

Figure 8:
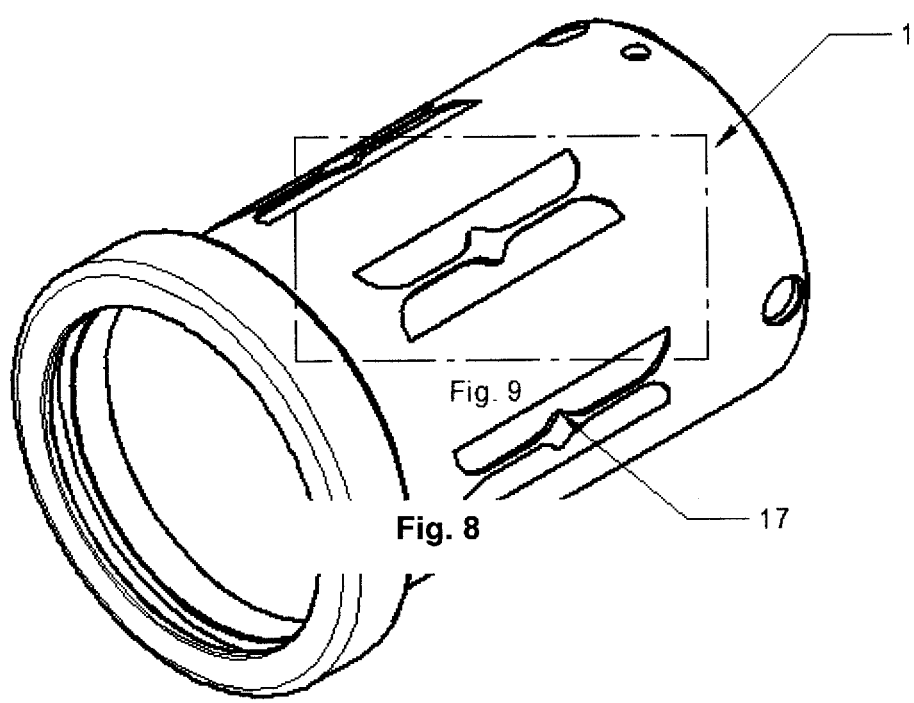
FIG. 8 is an isometric view of the sleeve which gives a visual representation of the sleeve design; and, FIG. 9 is a detailed view of FIG. 8 showing the variation in depth of the recesses.

Referring to FIG. 8 of the accompanying drawings, there is shown the elongated recesses 17 which extend axially along the sleeve 1. The elongated recesses 17 are spaced circumferentially around the periphery of said sleeve 1, preferably the elongated recesses 17 are spaced six times equally around the sleeve 1.

Figure 9:
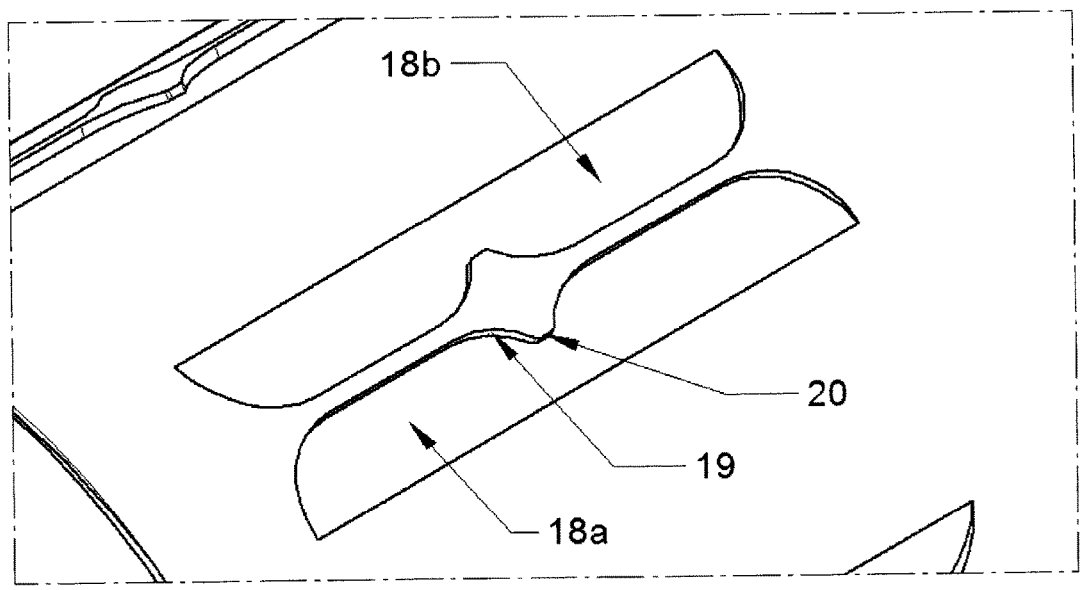

Referring to FIG. 9 of the accompanying drawings, there is shown a detailed view of the elongated recesses 17. The elongated recesses 17 are present in adjacent pairs 18a and 18b and shaped in such a way that the depth increases tangentially to produce a vertical section 19. The vertical section 19 acts to more effectively capture the barrier/buffer fluid as the sleeve 1 rotates. The circumferential extent of the elongated recesses 17 is reduced at the mid-portion 20. The mid-portion 20 is substantially triangular in shape and provides a fluid cutting effect.

While only several embodiments of the present invention have been shown and described, it will be obvious to those skilled in the art that many modifications may be made to the present invention without departing from the spirit and scope thereof.

What is claimed is:

1. A mechanical seal apparatus having two axially-spaced seals, comprising:
    a rotary component comprising at least one rotational member for each axially-spaced seal of said two axially-spaced seals;
    a stationary component comprising at least one stationary sealing member of each said axially-spaced seal of said two axially-spaced seals;
    a sleeve located radially inwards between said at least one rotational member for each said axially-spaced seal of said two axially-spaced seals; and,
    means for directing barrier or buffer fluid towards said sleeve between said two axially-spaced seals; and,
    means for displacing the barrier or buffer fluid axially toward said two axially-spaced seals, said means for displacing the barrier or buffer fluid being located on an outer surface of said sleeve and comprising a plurality of circumferentially-spaced apart recesses, protuberances or both recesses and protuberances, wherein the recesses or protuberances are elongated, extending axially along said sleeve and extend radially by an amount that increases circumferentially from a first edge to a second edge of each of the recesses or protuberances, and wherein a circumferential extent of the recesses or protuberances is reduced at a midpoint thereof for providing a fluid cutting effect.

2. The mechanical seal apparatus having two axially-spaced seals according to claim 1, wherein said circumferential extent of the recesses or protuberances being reduced is provided by a substantially triangular-shaped element extending into the recesses or protuberances from the first edge with the first edge having a greater depth than the second edge.

3. The mechanical seal apparatus having two axially-spaced seals according to claim 2, wherein the recesses or protuberances are arranged in circumferentially-spaced apart pairs, the first edges having the greater depth being adjacent each other.

4. The mechanical seal apparatus having two axially-spaced seals according to claim 1, wherein said stationary component surrounds at least a portion of said sleeve with a radial gap therebetween, the radial gap varying circumferentially for aiding axial and radial movement of the barrier or buffer fluid.

5. The mechanical seal apparatus having two axially-spaced seals according to claim 1, further comprising at least one angled barrier or buffer fluid port, wherein the barrier or buffer fluid is fed rearward of said at least one stationary sealing members for aiding in cooling said at least one stationary sealing components.

* * * * *